J. F. RALEIGH.
ENGINE STARTER.
APPLICATION FILED DEC. 1, 1913.
1,131,417.
Patented Mar. 9, 1915.
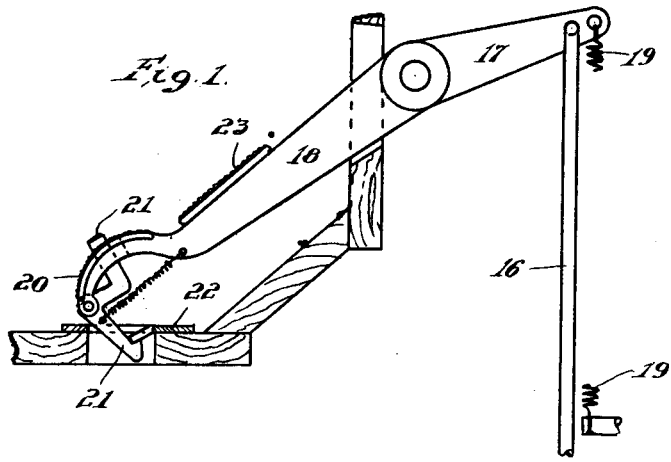
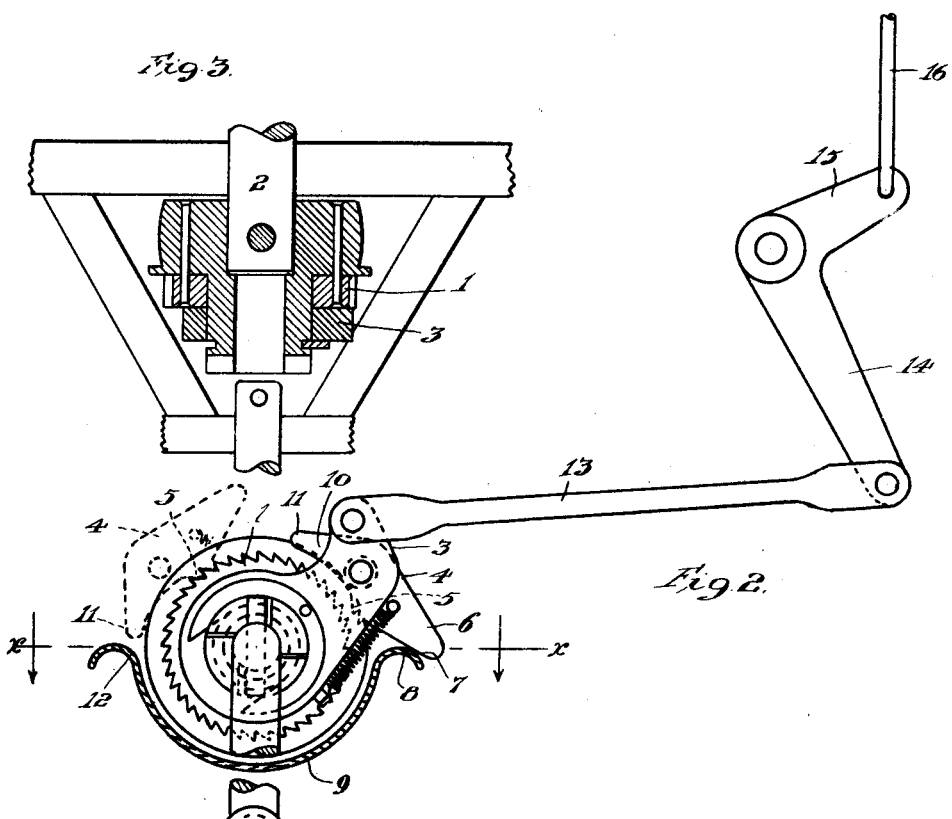
Witnesses:
A. Bull
B. G. Richards
Inventor:
James F. Raleigh.
By Joshua R. H. Potts
His Attorney.

UNITED STATES PATENT OFFICE.

JAMES F. RALEIGH, OF CHICAGO, ILLINOIS.

ENGINE-STARTER.

1,131,417.  Specification of Letters Patent.  Patented Mar. 9, 1915.

Application filed December 1, 1913. Serial No. 803,997.

*To all whom it may concern:*

Be it known that I, JAMES F. RALEIGH, a citizen of the United States, and a resident of the city of Chicago, county of Cook, and State of Illinois, have invented certain new and useful Improvements in Engine-Starters, of which the following is a specification.

My invention relates to improvements in engine starters especially adapted for use on automobiles and has for its object the provision of an improved construction of this character which is simple and efficient in use.

The invention consists in the combinations and arrangements of parts hereinafter described and claimed.

The invention will be best understood by reference to the accompanying drawing forming a part of this specification, and in which—

Figure 1 is a view of a foot lever employed in the construction, Fig. 2, an end view of the engine shaft equipped with means for starting the same, and Fig. 3, a section taken on substantially line $x$—$x$ of Fig. 2.

The preferred form of construction as illustrated in the drawing comprises a ratchet wheel which is fixed to engine shaft 2 in any suitable or desired manner. A pawl arm 3 is arranged to revolve freely adjacent ratchet wheel 1 and carries a pawl 4 provided on its inner face with teeth 5 adapted to engage the teeth of ratchet wheel 1. Pawl 4 is provided with a forward extension 6 having an outwardly acting cam surface 7 which is arranged to contact with a stationary cam surface 8 at the forward terminus of the movement of said pawl and arm to force said pawl teeth 5 out of engagement with ratchet 1. Cam surface 8 is formed at one end of a cam member 9 which partially embraces ratchet 1 and is secured in position by any suitable or desired means not shown. Pawl 4 is also provided with a rearward extension 10 having an inwardly acting cam surface 11 arranged to engage a stationary cam surface 12 on cam member 9 and throw ratchet teeth 5 out of engagement at the rearward terminus of the movement of pawl arm 3 and pawl 4 as will be readily understood. By this arrangement it will be observed that at both the rearward and forward termini of the movement of pawl arm 3 the pawl 4 will be automatically disengaged from ratchet 1. The disengagement on the forward movement prevents rattling or clicking of the pawl during normal operation and disengagement on the rearward movement prevents injury from "back-firing" of the engine.

Pawl arm 3 is connected by a link 13 with an arm 14 of a bell crank lever, the other arm 15 of which is connected by a link 16 with the rearward arm 17 of a lever 18 mounted in the automobile under the seat thereof and projecting forwardly and rearwardly with relation thereto. The other arm 18 of said lever projects forwardly in operative relation with the feet of the car driver and a spring 19 serves to draw arm 18 upwardly. The outer end of arm 18 is provided with a pedal 20 adapted to support the foot of the driver and a locking dog 21 is arranged on said lever in operative relation with said pedal so as to be engaged by a foot on said pedal and rendered inoperative as will be readily understood. The lower end of dog 21 is arranged to engage a catch plate 22 automatically upon depression of lever arm 18. Lever arm 18 is also provided with a supplemental pedal 23 by means of which said lever arm may be depressed to cause automatic engagement of locking dog 21 to hold arm 18 in depressed position.

In use when it is desired to start the engine the foot is placed upon pedal 20 thus releasing dog 21 and the lever arm 18 permitted to rise under the influence of spring 19. Upon depression of lever arm 18 pawl arm 3 is caused to make an operative stroke with relation to ratchet 1 and turns the engine shaft through a partial revolution. If this does not start the engine, the operation may be repeated as often as desired, the locking dog 21 being constantly held from locking catch plate 22 by the pressure. After the engine is started the foot is shifted to pedal 23 and arm 18 depressed, whereupon locking dog 21 automatically engages catch plate 22 to hold the parts in their normal position resting upon pawl 4 before engagement with ratchet 1. In case of back-firing of the engine and consequent reversal thereof the cam surface 11 disengages the pawl and thus prevents injury to the operator.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim is new and desire to secure by Letters Patent is:

1. The combination with an engine shaft, of a ratchet wheel connected to operate said shaft; a pawl arm adjacent said ratchet wheel; a pawl pivoted on said arm adapted to engage said ratchet wheel and provided with a rearward extension; means for moving said arm through a portion of a revolution; an inwardly acting cam surface on the rear portion of said pawl; an outwardly acting cam surface on the forward portion of said pawl; and stationary cam members coöperating with said cam surfaces to throw said pawl out of engagement with said ratchet at each end of the stroke of said pawl arm, substantially as described.

2. The combination with an engine shaft, of a ratchet wheel connected to operate said shaft; a pawl arm adjacent said ratchet wheel; a pawl on said arm adapted to engage said ratchet wheel; a lever operatively connected with said pawl arm and arranged to revolve said pawl arm through a portion of a revolution; automatic means for locking said lever in position at the forward terminus of its movement; means at the forward terminus of movement arranged to hold said pawl out of engagement with said ratchet and means at the rearward terminus of said movement arranged to throw said pawl out of engagement with said ratchet automatically, substantially as described.

3. The combination with an engine shaft, of a ratchet wheel connected to operate said shaft; a pawl arm adjacent said ratchet wheel; a pawl on said arm adapted to engage said ratchet wheel; a lever operatively connected with said pawl arm and arranged to revolve said pawl arm through a portion of a revolution; automatic means for locking said lever in position at the forward terminus of its movement; and means at the forward and rearward termini of said movement arranged to throw said pawl out of engagement with said ratchet automatically and hold said pawl out of such engagement, substantially as described.

In testimony whereof I have signed my name to this specification in the presence of two subscribing witnesses.

JAMES F. RALEIGH.

Witnesses:
JOSHUA R. H. POTTS,
B. G. RICHARDS.